Sept. 26, 1939.   G. H. DOWTY   2,174,315
AIRCRAFT UNDERCARRIAGE
Filed March 15, 1937   2 Sheets-Sheet 2
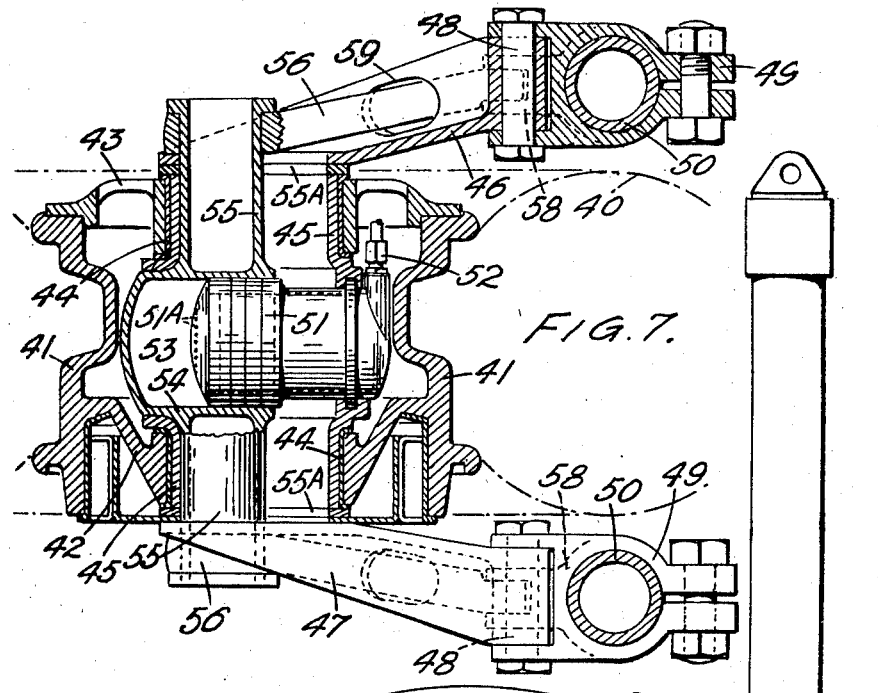
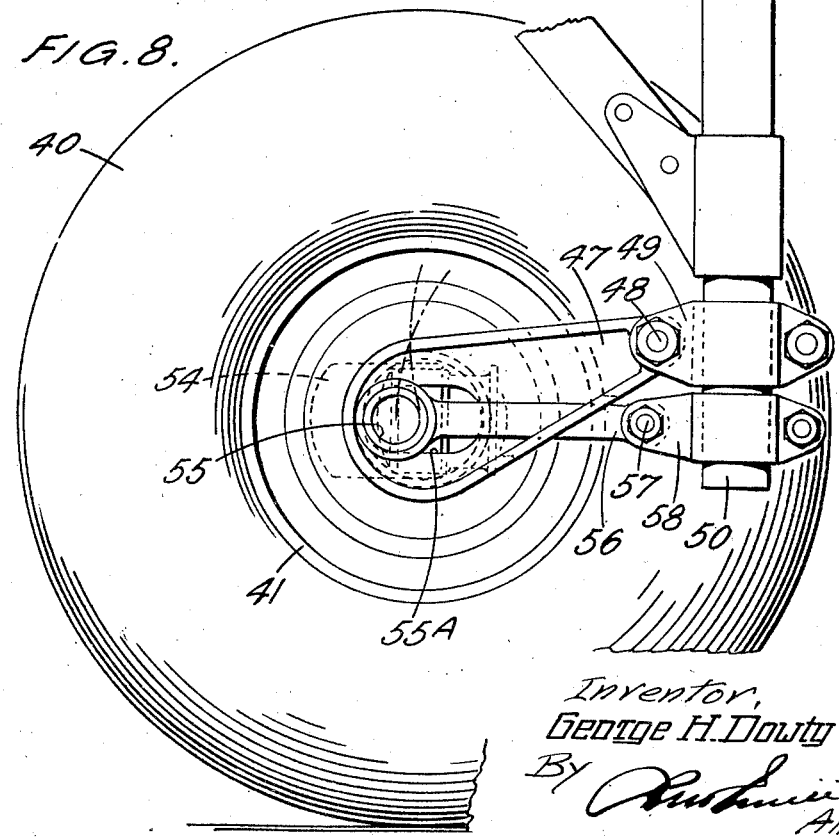
Inventor,
George H. Dowty
By
Atty.

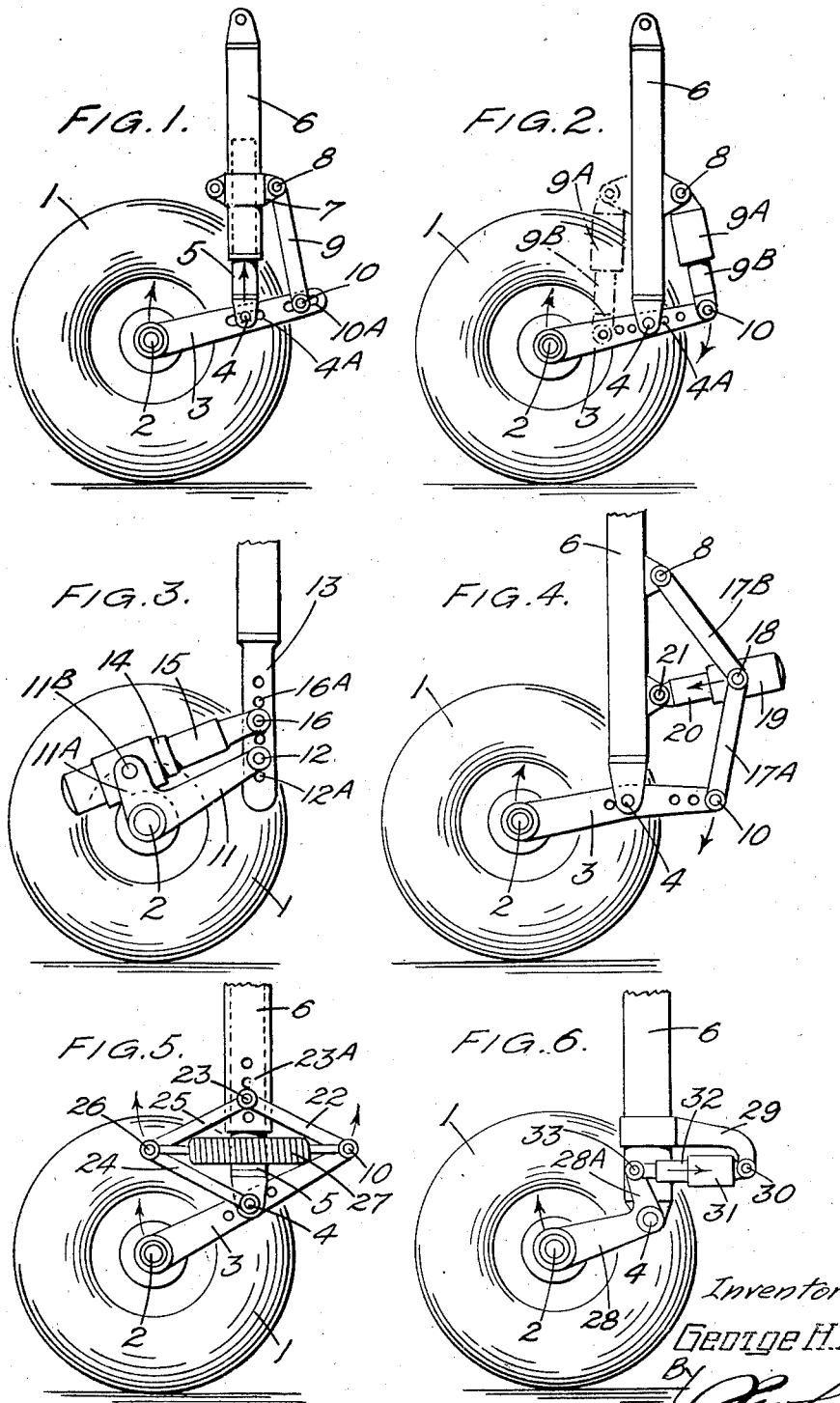

Patented Sept. 26, 1939

2,174,315

UNITED STATES PATENT OFFICE 2,174,315

AIRCRAFT UNDERCARRIAGE

George Herbert Dowty, Cheltenham, England

REISSUED

Application March 15, 1937, Serial No. 131,036
In Great Britain March 16, 1936

25 Claims. (Cl. 244—104)

This invention relates to aircraft undercarriages, and its primary object is to provide a construction of a whole or part of an undercarriage the merit of which will be that parts and units, as complete structures, may be standardised so that the same stores may be available for a large number of different vertical aircraft, and discrepancies arising from the different landing speeds, weights, and other factors of different aircraft, may be met by merely altering the arrangement of parts and other easily variable characteristics, without the necessity for actually replacing the parts by others. The invention also seeks to provide a convenient unitary shock-absorbing system for aircraft undercarriages capable of ready adjustment or re-setting to cope with changing conditions, and one which may also be usable possibly with modification, for float or ski work. The invention further includes an improved adaptation of what are commonly known as resilient wheels, according to which such wheels can be used virtually without structural alteration, and despite the comparative shortness of available stroke of their shock absorbers (imposed by constructional requirements), may be allowed a very considerable vertical component of movement under load and may be so adjusted that their shock absorbing or resilient properties are matched to the expected load. It is contemplated that in the ordinary course the stroke of the resilient parts will be dimensionally considerably less than the required vertical movement of the wheel. In certain cases of aircraft design it may be a desideratum that an undercarriage structure be formed of a substantially rigid frame or member and should carry a wheel as a self-contained unit, which provides the necessary resilience; such wheels, however, particularly if they be equipped for relatively low pressure tyres, have very limited accommodation for internal shock absorber mechanism, and it is consequently desirable so to equip or mount them in relation to the undercarriage that despite the limited scope of the resilient means, the wheel has a sufficient vertical travel. The term "shock absorber" as appearing in the specification and claims of this application is intended to mean a resilient device, or one which dissipates energy in yielding. For example, a compressed air shock absorber may be a piston and cylinder or dash-pot displacing liquid against the resilient resistance of compressed air, the liquid flow being resisted by orifice means so that energy is dissipated thereby.

In the following specification "undercarriage structure" means the whole of what would ordinarily be understood to be a complete undercarriage, whether in itself rigid or having some degree of resilience, without the wheel, skid or float which would normally be fitted. It is, in short, the structure which is intended to carry the wheel or the like sufficiently far below the aircraft for landing and taking off purposes and which is rigid when operative as an undercarriage though it may be retractable. Where the term "wheel" is used, and where the sense permits, it is intended to be the equivalent of a float, ski or the like, and it will be readily appreciated from the following that in several of its forms the invention is directly applicable to such devices, generally called a landing element. "Wheel mounting" means an assembly of moving parts which attaches the wheel to the fixed, or separately resilient, parts of the aircraft, e. g. to a fixed undercarriage structure. Where vertical wheel travel is referred to, there is meant a vertical component of wheel travel whether or not there is also a horizontal component.

According to one aspect of the invention there is provided in or for an aircraft undercarriage a wheel mounting formed as a unit, comprising a polygonal frame pivotally joined so as to be deformable under landing load against a shock absorber, there being provision for the variation at choice, as by suitable adjustment of the positions of axes of the pivots, of the ratio between vertical wheel travel, that is to say the vertical component of wheel travel under the deforming load, and shock absorber deflection. Moreover, the geometry is preferably such that the actual length of shock absorber deflection is small compared with the vertical component of wheel travel. For example, in the ratio of 1 to 3, or in that order. Means are provided for readily varying the resistance to deflection of the shock absorber, for example means whereby the inflation pressure of a pneumatic dashpot shock absorber may be readily varied. The shock absorber may form one side of the polygonal frame, and in that case will ordinarily be a telescopic shock absorber. The frame may be triangular or quadrilateral, and various arrangements are described hereinafter and defined in the claims. The invention also includes a combination for actual practical use which has the above features. In this combination there is an aircraft landing wheel containing a shock absorber (in manner known per se) in which one part of the shock absorber is fixed to a non-rotating hub and the other part is guided for reciprocating movement in said hub, and each part (of the absorber) is connected to a rigid side of a substantially triangular frame which is articulated for deformation and which is adapted to be attached to an otherwise complete undercarriage some part of which may form one side of the frame, the arrangement being such that deformations of the frame under landing load against the restraint imposed by the shock absorber, result in a substantially greater vertical wheel movement than shock absorber deflection. In this combination it is preferred that the shock absorber be disposed substantially horizontally whilst the parts comprising the mounting and the manner of attachment to the undercarriage constrains the wheel to move substantially vertically. In this constructional embodiment of the invention the features detailed elsewhere may be included, e. g. means for adjusting the ratio between vertical wheel travel and shock absorber deflection, means for readily adjusting the resistance to deflection of the shock absorber, as by varying the initial air pressure therein, and other constructional features are also preferably present, such as the lateral disposition of pairs of levers forming duplicated frames (which act in effect as if they were one frame), and a particular arrangement of links and the like for effecting the desired object. The invention embodies further characterising features largely of a constructional nature and therefore more easily explained with the aid of the accompanying drawings. In these, Figures 1 to 6 are diagrammatic sketches of various arrangements within the invention, and Figure 7 is a diametric section through a wheel and shock absorber of an actual constructional embodiment of the invention, of which Figure 8 is a side elevation.

In Figure 1 the wheel 1 is borne at the axis 2 which is at the end of a lever 3 fulcrumed at the axis 4 to the sliding part 5 of a telescopic leg forming part of an undercarriage structure. The fixed part of the leg 6 has clipped to it by the clip 7 a pivot 8 to which there is attached a link 9 which, in its turn, is pivoted at 10 to the other end of the lever 3. The lever 3 preferably has alternative pivot positions for the axes at 4 and 10, as indicated for example at 4A and 10A, and these may be made use of to adjust the ratio between the vertical component of wheel movement under load and relative movement between the shock absorbing parts 5, 6. The clip 7 may be shifted as part of the same, or as part of an independent adjustment. Any suitable means may be provided for varying the initial compression of the resilient element controlling the parts 5 and 6. It will be appreciated that the triangular figure constituted between the axes 4, 8 and 10 is an articulated triangular frame which is deformable against the resilient resistance of the shock absorber 5, 6: and constitutes the wheel mounting.

Figure 2 shows a modification wherein (similar parts being similarly indicated) there is a fixed undercarriage structure leg 6 to which is articulated at 8 the telescopic shock absorber unit comprising the two relatively slidable parts 9A, 9B, which is again pivoted at 10 to the other end of the lever 3. As drawn in full line, this shock absorber is one operating in tension, whilst in broken line it is one operating in compression. The triangular articulated frame constituted as before between the pivots 4, 8 and 10, is again rendered adjustable by the provision of additional holes such as 4A for the pivot 4, or other suitable means, and the shock absorber 9A, 9B will also be provided with means for adjusting its resistance to load.

In Figure 3 the wheel axis 2 is situated at the end of a lever 11 the other end of which is pivoted or fulcrumed at 12 to the bottom end of a rigid undercarriage leg 13. The lever 11 has a cranked portion or lug 11A which is pivotally connected at the axis 11B to a slidable part 14 of a telescopic shock absorber of which the fixed or ram part 15 is pivoted at 16 to the leg 13; the pivots 12 and 16 are virtually vertically spaced. Here again any suitable means may be provided for varying the geometry, and therefore the ratio of operation, of the device, such for example as the alternative pivot positions 16A, 12A, and simultaneously with such readjustment or resetting there would be effected a corresponding increase or decrease of resistance to deflection of the shock absorber 14, 15.

Turning now to Figure 4, the principal feature which is indicated is the possibility of a quadrilateral frame being employed, with a single toggle linkage; the wheel centre at 2 is again carried by a lever 3 fulcrumed at 4 to a fixed undercarriage leg 6 the other end of the lever 3 being articulated at 10 to one of a pair of toggle links 17A, 17B which are interconnected at the axis 18 and again pivoted to the leg 6 at axis 8. Extending across the quadrilateral formed between the centres 4, 8, 18, 10, is a compression telescopic shock absorber with its outer cylindrical part 19 articulated at the axis 18 and therefore attached to the toggle, and its inner part 20 pivoted to the leg 6 and 21. The operation of this should be sufficiently obvious, and it merely remains to be observed that such a system possibly gives greater scope for adjustment than the simpler triangular systems, because the links of the sides and the positions of the pivots, any of which can be adjusted, are more numerous.

Figure 5 shows a combination of a telescopic leg with an auxiliary shock absorber; the wheel centre 2 is carried by the lever 3 which is fulcrumed at the axis 4 to the inner or sliding part 5 of a telescopic shock absorbing leg of which the outer and fixed part is shown at 6. The other end (at 10) of the lever 3 is connected by a link 22 at the axis 23 to the part 6. At the axis 4 a link 24 is connected opposite the link 22, and the link 24 is pivotally connected to the axis 23 by the link 25, and pivotal connection 26. Thus a quadrilateral is formed which is deformable in accordance with the deflections of the leg 5, 6; to enable the loading to be adjusted however, there is connected between 10 and 26 a further shock absorbing element such as 27 the characteristics of which are variable at choice. Again, there may be several ways in which the initial geometry and therefore movement ratio may be adjusted, such for example as the additional position 23A for the axis 23.

As a last example of a geometry, Figure 6 shows a wheel axis 2 supported on a lever 28 fulcrumed at 4 to a fixed undercarriage leg 6 which leg carries a laterally extending lug or bracket 29 with a pivotal attachment 30 for the stationary part 31 of a compression type shock absorber of which the ram or moving part 32 is pivoted at axis 33 to a cranked tail or lug extension of the lever 28. The position of the part 29 may be adjusted vertically upon the leg 6, or there may be adjustments of the position of the axes 4 or 33 to vary the ratio of movement.

The above will suffice to indicate that the invention may be embodied in a variety of different geometries or arrangements. Figures 7 and 8 show an application of the invention of which the geometry is analogous to that of Figure 3. Further features are, however, introduced in this example, the most important of which is the feature concerning the arrangement of a telescopic shock absorber within a wheel, the shock absorber, contrary to known practice, being disposed harizontally rather than vertically. It is believed that it is in this form that the invention achieves its greatest practical application. In these figures the wheel tyre 40 is carried by the rim 41 which has an inward somewhat conical flange 42 integral with it, and an annular end plate 43 which is detachable, and the parts 42, 43, house the wheel bearing which is represented by the plain bush 44 upon a hollow spindle 45 which is, in effect, a non-rotating hub and which is rigidly secured at each of its ends to a pair of laterally disposed levers 46 and 47, which levers are pivotally attached by pins 48 to adjustable clips 49 secured on a fixed undercarriage leg 50. Rigidly mounted within the spindle or hub 45 and projecting thereinto radially, is a hollow piston or plunger 51 which has a readily accessible connection 52 comprising a union by which air can be introduced or released so as to pass into and inflate the piston: the piston 51 has an idle or floating piston slidable within it, separating oil from air. The piston 51 slides in a cylinder 54 with a space 53 filled with oil; the cylinder 54 is diametrically and integrally formed in a stub axle 55 which is a connecting element disposed axially across the hub 45 with sufficient space for the desired stroke of the piston and cylinder shock absorber; the element or axle 55 can reciprocate in a diametric direction to and fro across the interior of the spindle 45 in guideways 55A. The crown of the piston 51 has perforations at 51A or other porting arrangements which may be controlled by damping valves in the manner well known in the art. The piston and cylinder therefore forms in effect a pneumatic dashpot or oleo-pneumatic shock absorber, the air being the resilient medium, further compressed by the displacement of the oil. The outer ends of the axle 55 are secured to a pair of links 56 the ends of which are pivotally attached by pins such as 57 to clips 58 which are again attached to the legs 50. The links 56 preferably pass through clearance holes such as 59 in webs of the levers 46. The spacing of the clips 49 and 58 upon the leg 50 is readily adjustable so that the ratio between vertical movement of the wheel as a whole and resultant relative movement of the piston 51 in the cylinder 54, is variable. At the same time as making such a variation, the initial air pressure within the space 53 will be adjusted.

In this constructional form of the invention it will be seen that, without changing or replacing any actual part of element but merely by adjustment of one sort or another, the load-carrying characteristics of the undercarriage can be altered at choice. Thus a wheel mounting formed as a unit and including the parts 46 and 56, may readily be applied to aircraft of different weights, or having different requirements, in regard to undercarriage behavior and this should make possible a considerable economy in production and in regard to the necessity for keeping different sorts of spare parts and reserves. The example described is not to be regarded as restrictive in scope, since evidently variations and equivalents will readily suggest themselves to those skilled in the art.

What I claim is:

1. In an aircraft structure, a landing wheel or equivalent mounting comprising a frame of a plurality of articulated rigid elements, a two-part shock absorber of which one of the two parts is rigid with one of the said elements and which in deflecting resists angular deformation of said frame, vertically spaced means for anchoring elements of said frame to an undercarriage of the aircraft, means whereby a landing wheel or equivalent is carried by said frame so that vertical wheel travel under landing loads of the aircraft accompanies said deformation and shock absorber deflection and is always dimensionally greater than said deflection, and means for varying at choice the ratio between said wheel travel and the deflection.

2. In an aircraft structure, a landing wheel or equivalent mounting comprising a frame of a plurality of articulated rigid elements, a shock absorber which in deflecting resists angular deformation of said frame, means for wholly supporting the shock absorber by the frame in a specific position relative to an element thereof, means for separately and pivotally anchoring elements of said frame to the undercarriage, means whereby a landing element is carried by said frame so that vertical landing element travel accompanies said deformation under landing loads of the aircraft, means for varying at choice the ratio between said element travel under landing load and shock absorber deflection, and means associated with the shock absorber for varying its resistance to said deflection.

3. In an aircraft structure, an undercarriage, a wheel mounting comprising a rigid lever, a first pivot attachment to attach said lever to said undercarriage, a shock absorber having two relatively moving parts, a first and rigid connection between said lever and one of said parts, a rigid link, a second pivot attachment to attach said link to said undercarriage at any one of several points variably spaced from said first pivot attachment, a connection between said link and the other of said shock absorber parts, said lever and link cooperating in their angular movements about said first and second pivot attachments to deflect the shock absorber, and a bearing for rotatably attaching a landing wheel to the mounting so constituted.

4. In combination, an aircraft landing wheel, a non-rotating hub therefor, a fixed shock absorber part carried by said hub, a moving part of said shock absorber cooperating with said fixed part, means whereby said moving part is guided for reciprocating movement in said hub, a first rigid frame element attached to said hub, a second rigid frame element attached to said moving shock absorber part, spaced pivot joints between said rigid elements and an undercarriage part, and means for selectively varying the effective spacing of said joints.

5. In combination, an aircraft landing wheel, a non-rotating hub therefor, a first shock absorber part carried by said hub, a second part of said shock absorber cooperating with said first part, means whereby said second part is guided for horizontal reciprocating movement in said hub, a first rigid frame element attached to said hub, a second rigid frame element attached to said second shock absorber part, vertically spaced pivot joints between said rigid elements and an undercarriage part, and means for selectively varying the effective vertical spacing of said joints.

6. In combination, an aircraft landing wheel, a non-rotating hub therefor, a first shock absorber part carried by said hub, a second part of said shock absorber cooperating with said first part, means whereby said second part is guided for reciprocating movement in said hub, a first rigid frame element attached to said hub, a second rigid frame element attached to said second shock absorber part, spaced pivot joints between said rigid elements and an undercarriage part, means for selectively varying the effective spacing of said joints, and means for selectively varying the resistance to deflection of the shock absorber.

7. In combination, an aircraft landing wheel, a non-rotating hub therefor, a first compressed air shock absorber part carried by said hub, a relatively moving second part of said shock absorber cooperating with said fixed part, means whereby said second part is guided for horizontal reciprocating movement in said hub, a first rigid frame element attached to said hub, a second rigid frame element attached to said second shock absorber part, vertically spaced pivot joints between said rigid elements and an undercarriage part, means for selectively varying the effective vertical spacing of said joints, and means for selectively varying the initial pressure within the shock absorber.

8. In or for an aircraft undercarriage, a landing wheel, axially spaced rotating bearing parts therefor, complementary non-rotating bearing parts, a non-rotating hub carrying said non-rotating bearing parts, a piston rigid with said hub and horizontally disposed diametrically with respect to said bearing parts, a horizontal cylinder complementary to said piston, a connecting element solid with said piston, guideways in said hub for said element, levers fixed to said hub, axially externally of said bearing parts, links pivoted to said element axially externally of said bearing parts; and vertically spaced pivot attachments between said levers and pivots and the undercarriage.

9. The construction of claim 8, further comprising externally accessible means for inflating said cylinder.

10. The construction of claim 8, further comprising liquid dashpot energy dissipating means associated with said piston and cylinder.

11. The construction of claim 8, further comprising means for selectively altering the vertical spacing of said vertically spaced pivot attachments.

12. In an aircraft structure, a downwardly projecting undercarriage, a landing wheel mounting structure comprising a plurality of rigid elements each articulated for relative angular movement in the same plane, a landing wheel, a bearing between said wheel and said mounting structure, pivot joints between said structure and said undercarriage whereby said structure and said undercarriage constitute a closed polygonal frame projecting laterally to one side of said undercarriage, a shock absorber resisting said angular movement, means for enabling said pivot joints to be relatively spaced at different distances at choice, and means for adjusting the resistance of said shock absorber, the wheel, elements and pivot joints being so arranged that vertical wheel travel under landing loads of said aircraft are accompanied by shock absorber deflections in a ratio which is determined by said relative spacing.

13. In combination a landing wheel for aircraft and the like, a non-rotating hub, a two-part telescopic shock absorber carried by the hub wholly within the length thereof one part fixed with the hub, and a supporting structure for the wheel including an element connected to the hub and a second element connected to one of the telescopic members of the shock absorber, the second element being movable angularly relative to the first element against shock absorber resistance, said elements forming a cantilever structure deformable in vertical motion of the wheel under landing load.

14. In combination an aircraft landing wheel a non-rotating hub, a lever arm rigid with the hub and secured pivotally to a fixed element of the aircraft, a two-part telescopic shock absorber carried by and arranged wholly within the length of the hub, and a second arm operating to control one of the telescopic members of the shock absorber to vary the resistive influence of the shock absorber, said second arm being connected pivotally to said fixed element, with the arms relatively movable to predetermined shock absorber influence.

15. An aircraft landing wheel including a non-rotating hub, means secured to the hub and extending beyond and supporting the wheel, a two-part telescopic shock absorber carried by and arranged wholly within the length of the hub, one of the telescopic elements of the shock absorber being movable to predetermine the degree of the resistive shock absorber influence, and means whereby said movable element may be adjusted to predetermined shock absorber influence, the wheel supporting means and the means for controlling shock absorber influence being relatively movable for shock absorber adjustment.

16. An aircraft undercarriage, including a member depending from the aircraft and unyielding in response to landing load, a landing element having movement in a substantially definite path under landing load, a shock absorber bodily responsive to landing load movement of the landing element, and means formed as a cantilever deformable structure extending to one side of said member and constituting the sole support of the landing element and said absorber relative to the said member, said means being movable relative to said member upon occurrence of the landing load movement of the landing element to thereby cause operative deflection of the shock absorber.

17. An aircraft undercarriage, including a member depending from the aircraft and unyielding in response to landing load, a landing element having movement in a substantially definite path to one side of said member under landing load, frame elements extending to that same side of said member constituting the sole support of the landing element relative to the fixed member, a shock absorber, mounting means to bodily carry said shock absorber by said elements, said frame elements being operatively and relatively influenced in the load-carrying function of the landing element to thereby insure operative deflection of the shock absorber.

18. An aircraft undercarriage, including a fixed member depending from the aircraft, a landing element having movement in a substantially definite path under landing load, a two-part shock absorber responsive as an entirety to landing load movement of the landing element, a multi-part frame forming the sole connection of the landing element relative to the fixed member, with separate parts of the frame connected to the respective parts of the shock absorber and extending thereto unilaterally of said member, parts of the frame being operatively and relatively influenced in the landing function of the element to thereby insure operative deflection of the shock absorber.

19. An aircraft undercarriage, comprising a fixed structure projecting downward from the aircraft, a substantially triangulated articulated deformable frame comprised by a compression lever pivoted to said structure on a first axis and a tension link pivoted to said structure on a second axis relatively immovable and substantially vertically spaced with respect to the first axis, a shock absorber connected between said lever and link to resist vertical deformation of the frame constituted by said lever and link, and a landing element supported by said frame.

20. An aircraft undercarriage, comprising a fixed structure projecting downward from the aircraft, a pair of rigid elements comprising a compression lever and a tension link pivoted thereto on axes spaced in the vertical sense and projecting unilaterally and convergently from said structure, a two-part shock absorber of which one part is movable bodily with the lever and the other part moves relatively thereto with the link, the parts of the shock absorber being relatively movable in shock absorber deflection, whereby relative displacement of the link and lever due to vertical yielding thereof is resisted by such shock absorber deflection, and a landing element supported by the structure formed by the lever and link.

21. An aircraft undercarriage, consisting in a fixed aircraft structure projected downward from the aircraft, a wheel mounting structure pivotally attached to said fixed structure and extending unilaterally thereof and comprising at least two rigid elements forming with said structure a deformable articulated polygonal frame, a landing element supported by said frame to one side of said structure, and a shock absorber wholly supported by said frame and connected to said rigid elements so as to resist deformation of said frame by deflection.

22. An aircraft undercarriage comprising a fixed structure projecting downward from the aircraft, a compression lever extending to one side thereof pivotally attached thereto on a first axis, a tension link extending to the same side of said structure pivoted to said structure on a second axis, a shock absorber carried wholly by said link and lever and operative to restrain relative angular movement between said link and lever, and a landing element supported by said link and lever for rising and falling under landing load, causing said angular movement.

23. In an aircraft undercarriage, a downwardly projecting supporting structure, a pair of frame elements attached thereto for angular movement in a vertical plane in differently centered arcs on axes which are substantially vertically spaced, a shock absorber carried by said elements to resist the relative movement set up between said elements, a deformable frame extending unilaterally of said structure being constituted by part of said structure, said frame elements, and said shock absorber; and a landing element carried by said frame to one side of said structure movable in the vertical plane relatively to said structure against the resistance of said shock absorber.

24. In an aircraft undercarriage, a downwardly extending leg, a laterally extending deformable wheel mounting attached to said leg and capable of pivotal movement relative thereto in the vertical plane, said movement involving articular deformation of said mounting, a shock absorber attachment means whereby said shock absorber is carried entirely by said mounting and is arranged to resist such deformation, and a landing element carried by said mounting.

25. An aircraft undercarriage comprising a landing wheel, a non-rotating hub supporting said wheel, a piston and cylinder compressed air shock absorber supported by said hub to operate substantially horizontally, a deformable articulated frame comprising rigid elements connected to the relatively movable shock absorber parts and constituting the sole means of support of the wheel, hub, and shock absorber relative to the aircraft, said shock absorber parts being constrained by said frame, and pivotal connecting means to connect said rigid elements to the aircraft structure at two different axes which are relatively immovable under landing load and both to one side of the axis of said hub.

GEORGE HERBERT DOWTY.